(12) United States Patent
Dumazert et al.

(10) Patent No.: US 9,972,200 B2
(45) Date of Patent: May 15, 2018

(54) SYSTEM AND METHOD FOR TRAFFIC SIGNAL TIMING ESTIMATION

(71) Applicant: KING ABDULLAH UNIVERSITY OF SCIENCE AND TECHNOLOGY, Thuwal (SA)

(72) Inventors: Julien Dumazert, Adamswiller (FR); Christian Claudel, Thuwal (SA)

(73) Assignee: KING ABDULLAH UNIVERSITY OF SCIENCE AND TECHNOLOGY, Thuwai (SA)

( * ) Notice: Subject to any disclaimer, the term of this patent is extended or adjusted under 35 U.S.C. 154(b) by 11 days.

(21) Appl. No.: 15/318,157

(22) PCT Filed: Jun. 17, 2015

(86) PCT No.: PCT/IB2015/001795
§ 371 (c)(1),
(2) Date: Dec. 12, 2016

(87) PCT Pub. No.: WO2015/198156
PCT Pub. Date: Dec. 30, 2015

(65) Prior Publication Data
US 2017/0124863 A1    May 4, 2017

Related U.S. Application Data

(60) Provisional application No. 62/012,983, filed on Jun. 17, 2014.

(51) Int. Cl.
*G08G 1/0967* (2006.01)
*G08G 1/01* (2006.01)
(Continued)

(52) U.S. Cl.
CPC ............ *G08G 1/0112* (2013.01); *G01S 19/13* (2013.01); *G08G 1/056* (2013.01); *H04W 4/028* (2013.01); *H04M 2250/10* (2013.01)

(58) Field of Classification Search
CPC .......... G08G 1/08; G08G 1/096; G08G 1/087; G08G 1/0125; G08G 1/056; G08G 1/0112; G01S 19/13; H04W 4/028; H04M 2250/10

USPC .......... 340/932, 906, 929, 916, 903.16, 922, 340/917, 907; 701/117, 118, 400
See application file for complete search history.

(56) References Cited

U.S. PATENT DOCUMENTS

2012/0139754 A1 *   6/2012   Ginsberg ......... G08G 1/096775
                                                    340/905
2012/0274481 A1 *   11/2012  Ginsberg ......... G08G 1/096775
                                                    340/905
(Continued)

FOREIGN PATENT DOCUMENTS

DE   WO 2013060774 A1 *   5/2013   ........... G08G 1/0112
JP   2013130931 A         7/2013
WO   2013/060774 A1       5/2013

OTHER PUBLICATIONS

International Search Report in related International Application No. PCT/IB2015/001795, dated Dec. 9, 2015.
(Continued)

*Primary Examiner* — George Bugg
*Assistant Examiner* — Munear Akki
(74) *Attorney, Agent, or Firm* — Patent Portfolio Builders PLLC

(57) ABSTRACT

A method and system for estimating traffic signals. The method and system can include constructing trajectories of probe vehicles from GPS data emitted by the probe vehicles, estimating traffic signal cycles, combining the estimates, and computing the traffic signal timing by maximizing a scoring function based on the estimates. Estimating traffic signal cycles can be based on transition times of the probe vehicles starting after a traffic signal turns green.

20 Claims, 7 Drawing Sheets

(51) Int. Cl.
*H04W 4/02* (2018.01)
*G08G 1/056* (2006.01)
*G01S 19/13* (2010.01)

(56) References Cited

U.S. PATENT DOCUMENTS

2013/0103291 A1 4/2013 Hayashida et al.
2014/0114885 A1* 4/2014 Han .................. G06N 3/0454
                                                                706/12

OTHER PUBLICATIONS

Written Opinion of the International Searching Authority in related International Application No. PCT/IB2015/001795, dated Dec. 9, 2015.
Examination Report in related GCC Patent Application No. GC 2015-29559, dated Aug. 30, 2016.
C.F. Daganzo, "Fundamentals of Transportation and Traffic Operations", Pergamon, Oxford, 1997.
B.D. Greenshields, "A Study of Traffic Capacity", Annual Meeting of Highway Research Board Proceedings, 1935, pp. 448-477.
T. Hunter et al., "The Path Inference Filter: Model-Based Low-Latency Map Matching of Probe Vehicle Data", CoRR, abs/1109.1966, 2011.
T. Hunter et al., "The Path Inference Filter: Model-Based Low-Latency Map Matching of Probe Vehicle Data", arXiv:1109.1066v2, Jun. 20, 2012.
P.E. Mazaré et al., "MATLAB Implementation of an Exact LWR Solver", downloaded from the internet Dec. 12, 2016 (http://traffic.berkeley,edu/project/downloads/lwrsolver).
P.E. Mazaré et al., "Analytical and Grid-Free Solutions to the Lighthill-Whitham-Richards Traffic Flow Model", Transportation Research Part B: Methodological, 45, 2011, pp. 1727-1748.

* cited by examiner (a) Saudi system     (b) Opposing directions (a) General setup     (b) Calculating starting time (a) Good choice of $w$    (b) Poor choice of $w$ Figure 8: Signal cycles function

SYSTEM AND METHOD FOR TRAFFIC SIGNAL TIMING ESTIMATION

CLAIM OF PRIORITY

This application claims priority to U.S. Provisional Patent Application No. 62/012,983, filed Jun. 17, 2014, which is incorporated by reference in its entirety.

TECHNICAL FIELD

The present invention relates to a system and method for estimating traffic signal timing at intersections from location data from probe vehicles.

BACKGROUND

Traffic congestion is a challenge that affects several levels of modern society throughout the world. Building reliable and cost-effective traffic monitoring systems can be an important aspect in addressing this phenomenon. Historically, the estimation of traffic congestion has been limited to highways, and has relied mostly on a static, dedicated sensing infrastructure such as loop detectors or cameras. Estimation of traffic on the secondary road networks has not been sufficiently address, perhaps at least in part due to the cost of deploying wide networks of sensors.

Various methodologies have been proposed to monitor traffic. For example, Virtual trip lines (VTLs) have been used to sample data. VTLs are imaginary checkpoints where vehicles emit a timestamp when they pass by. Some have proposed to derive signal timing from discontinuities in the velocities of floating vehicle data, which suffer from high noise levels. Recently, it has been postulated that GPS devices in cellular phones and in commercial fleets could be utilized to match the map location and trajectories of the devices using a path interference filter. Previous attempts to estimate traffic suffer from various limitations that are addressed herein.

SUMMARY

The present invention is generally directed to a system and method to estimate traffic signal timing.

An aspect for estimating traffic signal timing can include a computer processor and a non-transitory computer readable medium containing instructions directing the system to execute steps. The steps can include extracting one or more trajectories from probe data, matching the one or more trajectories to a map, determining signal cycles, and computing a signal timing estimation. The map can include one or more intersections. Computing a signal timing estimation can be based on an optimization of a score function.

In some embodiments, the probe data can include information sent a vehicle on a roadway. At least some of the one or more trajectories can be associated with the vehicle passing through the one or more intersections.

In other embodiments, the optimization of the scoring function can be a deterministic model. The deterministic model is a gradient descent model.

An aspect of the method to estimate traffic signals can include constructing trajectories of probe vehicles from GPS data emitted by the probe vehicles, estimating traffic signal cycles, combining the estimates, and computing the traffic signal timing by maximizing a scoring function based on the estimates. Estimating traffic signal cycles can be based on transition times of the probe vehicles starting after a traffic signal turns green. In some embodiments, the scoring function can be maximized by a deterministic model. The scoring function can be maximized according to a gradient descent.

Another aspect of an intelligent transportation system for estimating traffic signal timing can include a sensor array for detecting probe signals, a network connecting the sensor array with a computer processor, and a non-transitory computer readable medium containing instructions directing the system to execute steps. The probe signals can include probe position data. The steps can include extracting one or more trajectories from probe data, matching the one or more trajectories to a map, determining one or more signal cycles of the traffic signals, and computing a signal timing estimation based on an optimization of a score function. The map can include one or more intersections.

Another aspect of estimating traffic signals can include extracting one or more trajectories from probe data, matching the one or more trajectories to a map having one or more intersections, determining one or more signal cycles of the traffic signals, and computing a signal timing estimation based on an optimization of a scoring function.

In an embodiment, the probe data can include information sent a vehicle on a roadway. At least some of the one or more trajectories can be associated with the vehicle passing through the one or more intersections.

In another embodiment, the optimization of the scoring function can be a deterministic model. The deterministic model can be a gradient descent model.

In yet another embodiment, the probe data can be extracted from GPS data emitted from one or more devices disposed in one or more vehicles. The one or more devices can include a smart phone and/or a GPS device.

DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION

Figure 1:
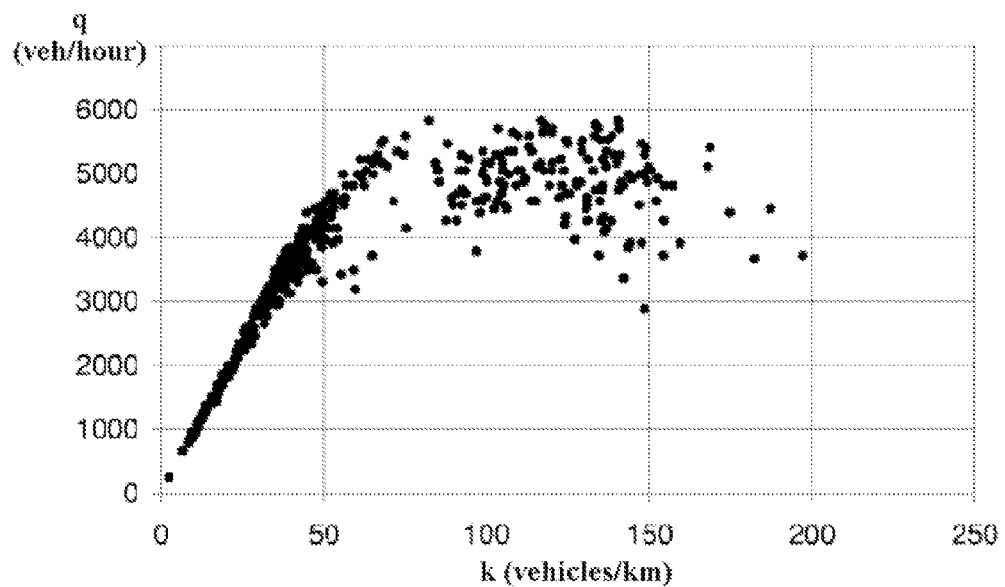
FIG. 1 depicts exemplary observations in a k-q diagram.

A detailed explanation of the system and method according to exemplary embodiments of the present invention are described below. Exemplary embodiments described, shown, and/or disclosed herein are not intended to limit the claims, but rather, are intended to instruct one of ordinary skill in the art as to various aspects of the invention. Other embodiments can be practiced and/or implemented without departing from the scope and spirit of the claimed invention.

Signal timing information can be important in traffic network optimization and traffic flow estimation. Nevertheless, signal parameters are often not available for administrative reasons, and manually collecting them has previously been impossible for wide areas. Embodiments can estimate signal timing using various parameters, for example those obtained from GPS positioning data of probe vehicles. Signals parameters can be crucial input to traffic flow estimation as they can provide boundary conditions on partial derivative equations used in traffic models. Embodiments herein can include a ready-to-use system and/or method to estimate signal timing parameters at an intersection based, for example, on GPS positioning data. The estimated parameters can include, among other parameters, cycle length, green phases duration times, and the time offset at which a cycle begins.

A limitation of previous commercial traffic monitoring applications can be requiring signal timing as input. For instance, estimation of traffic density and traffic-aware GPS guidance systems need to know the state of traffic signals to estimate traffic. Traffic signal information is also very important for routing algorithms, which have not taken these parameters into account because it has not been available to traffic maps providers. Having these parameters can significantly cut travel time between two points by choosing the optimal path by, for example, taking into account the duration of signals.

Many cities and/or administrations outsource the construction of traffic lights to private companies that do not disclose the signal parameters as it can be proprietary information. No common framework is available to obtain these parameters, and various cities use different technologies, which can make the work of determining the signal cycles difficult and/or time consuming. Therefore, embodiments herein can be based on information that is commonly available and can offer an automatic way of reconstructing signal patterns.

Applications of present embodiments are numerous, for example, better routing, better traffic state estimation, and better signal control for the traffic lights that can be actuated.

Embodiments for estimating traffic signal timing can be implemented with GPS and/or Galileo but is not limited to such systems or methodologies. It can be implemented, for example, with trilateration, triangulation, and/or others as desired. GPS data can be obtained from, for example, mobile devices, such as cellular phones and/or smart devices, and/or vehicle-integrated devices. Mobile device data can be obtained, for example, through local mobile operators.

A probe can be any transmitter, as desired, in a vehicle used for transmitting location data. A location datum can include a position of a probe and can further include a temporal data, such as a timestamp. To simplify the estimation, an assumption can be made that each probe emits its position with a constant time interval between two emissions. Yet, all vehicles need not emit their position at the same time, i.e. the vehicles are not synchronized. Some embodiments herein can rely on traffic light settings that are fixed or that evolve slowly compared to the dynamics of traffic. The system and method can also be implemented for actuated (time-varying) signals. For this, the periodicity assumption can be relaxed, which can affect performance. Therefore, a user-preferred and/or optimized tradeoff between flexibility and performance can be chosen. Embodiments need not but can include differentiation between several signals for a same incoming link (turn left, turn right, etc.). Further, short long GPS emission timestamps and/or long GPS emission timestamps, i.e. greater than 30 seconds, can be utilized.

In a general sense, an exemplary method can include three steps. In a first step, GPS observations can be mapped onto a road network. Trajectories of different probe vehicles can be reconstructed from, for example, emitted GPS data.

In a second step, estimates of red to green transition times for each incoming link can be derived from vehicles restarting, queuing, and/or getting out of the queue. For example, when a light turns to green, the queued vehicles restart. The restarting vehicles can be detected, and the detected data can be used to estimate the time when the light turns to green. This step can be achieved, for example, by assuming that the traffic follows the Lighthill-Whitham-Richards (LWR) model; each restarting vehicle provides one estimate.

In a third step, estimates can be combined into a maximization program that yields a final estimate of the signal timing parameters. The most likely signal timing can be computed. A score function based on the computed estimates can be maximized. Optimization can be performed, for example, by using gradient descent. Other types of optimization algorithms can be utilized such as Quasi-Newton method, mixed-integer programming, conjugate gradient, simulated annealing, iterative projection, genetic algorithms, or other optimization techniques as preferred. Performance can also be tested, if desired, by using, e.g., microscopic simulation.

Models used to describe traffic flow can depend on the scale of study. Microscopic (car-following) models describe interactions between vehicles whereas macroscopic (continuum) models zoom out, generally only dealing with relationships between macroscopic variables. Microscopic models generally seek to understand and use the underlying mechanisms of traffic and driving. Understanding how vehicle following works can contribute to an understanding of traffic flow in general. Such a level of detail may not be necessary to model traffic at a larger scale. Macroscopic models can erase vehicle-driver behaviors and formulates relationships between traffic characteristics instead. Macroscopic models can sometimes rely on the assumption that traffic flow shares similarities with fluid streams. They diverge from each other by the order of the partial derivatives of macroscopic quantities (flow, speed and density) they involve.

Car-following models can be time-continuous; the dynamics of vehicles and their mutual interactions can be described by a set of continuous partial derivative equations. Such models can integrate some or all of the physical phenomena involved in the activity of driving into a simplified framework. An assumption that can be made is that the behavior of a vehicle i depends on the kinematic properties of the n preceding vehicles: $\ddot{x}_i = F(x_i, \dot{x}_i, x_{i-1}, \dot{x}_{i-1}, \ldots, x_{i-n}, \dot{x}_{i-n})$. Car-following models can differ by the choice of the function F representing interactions between vehicles. Also, F can integrate drivers' behavioral preferences and reactions to stimuli, vehicle technical characteristics and other influencing factors.

A foundation of macroscopic models is a kinematic wave theory developed independently by Lighthill and Whitham (1955), and Richards (1956), each of which are in their entirety incorporated herein by reference. The so-called LWR model extends relations verified in stationary traffic conditions to all conditions, acting as a first-order approximation of dynamic speed-flow-density relations. It can successfully describe propagation and rarefaction of congestion waves.

The LWR model can consider drivers as responding perfectly to stimulus, e.g. drivers instantly adjust their speed to precisely the right amount. To integrate more complex driving behaviors, such as anticipation or inertia, higher-order models can be used to improve upon the LWR model. Such models can describe congestion waves as in the LWR model and add explanation for instability and downstream-directed waves. An example of instability is the amplification of a disturbance in traffic flow such as sudden braking resulting in hours-long stop-and-go oscillations. LWR initially failed to describe this phenomenon. Higher-order models can also give a structure to shock (congestion) waves, which were of null width in the LWR model. Nevertheless, the LWR model can be sufficient in many traffic estimation applications. A main concern, behavior of congestion waves, can be properly described by the first-order LWR model.

Understanding traffic flow at a macroscopic scale can require relations between three characteristics of traffic: the density k the flow rate q, and the speed u. Due to the discrete nature of vehicles driving on a highway, defining these aggregative quantities can require properly setting up an observation area consisting of a time interval and a space interval.

A first immediate relationship is the flow-density-speed relationship, standard throughout physical sciences:

$$q = ku \quad (1)$$

Note that the aggregative quantities q, k and u have been defined so that this relationship holds.

Equation (1) leaves two independent variables. Empirical observations of stationary (flow rates do not change over time) and homogeneous (vehicles are equal in all characteristics and behaviors) traffic flows can introduce a relationship between the two remaining variables.

Figure 2:
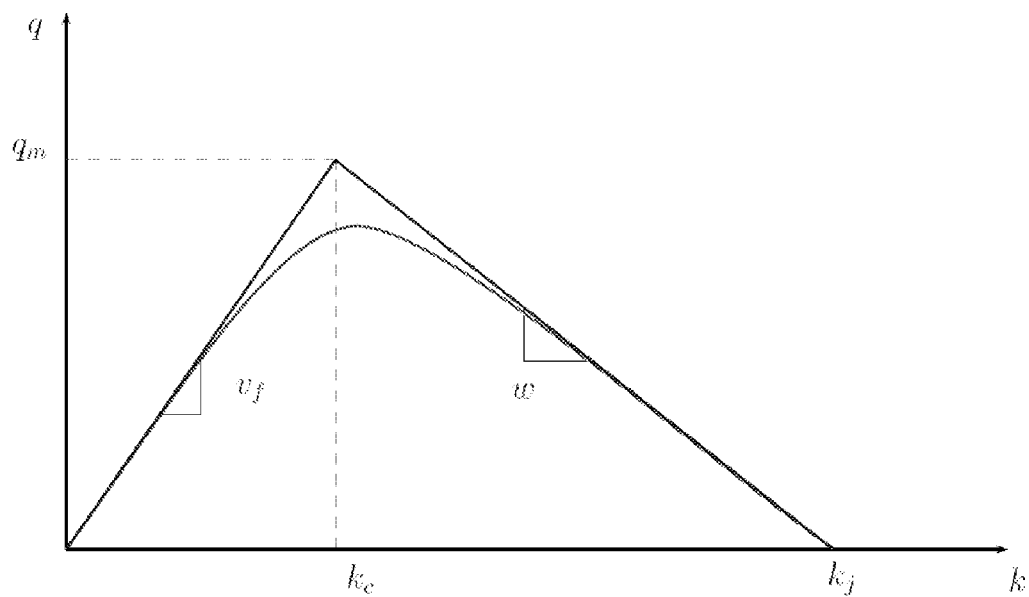
FIG. 2 illustrates a fundamental diagram of a traffic flow.

FIG. 1 shows observations carried out on a real highway, where traffic is neither stationary nor homogeneous. Nonetheless, the visible equilibrium state is the basis for the fundamental diagram described in FIG. 2. A fundamental diagram applies to a specific road and is obtained through observation. On this specific road, stationary and homogeneous traffic is in a state located on the curved line in FIG. 2.

Several traffic conditions can arise, including for example free flowing traffic, saturated traffic, and capacity traffic. In free flowing traffic, density is low enough (inferior to the critical density $k_c$) that vehicles are not impeded by each other. They all travel at free-flow speed $v_f$. In saturated traffic, density is at a maximum and set at jam density $k_j$. Vehicles no longer travel and wait in a queue. In capacity traffic, density is between $k_c$ and $k_j$. As a result, vehicles impede each other and reduce their speed accordingly. The traveling speed is lower than $v_f$ which is well described by the concavity of the fundamental diagram. The congestion speed w is the speed at which a congestion wave travels and is discussed in derivations below.

Formulations have been made to account for the shape of the fundamental diagram. Among them, the triangular approximation, laid over the fundamental diagram curve in FIG. 2, can be acceptable for at least three reasons.

One reason can be that the parameters of the triangular fundamental diagram are easily deduced by mere observation of the vehicles and of the environment: the free-flow speed $v_f$ is the speed limit; the jam density $k_j$ can be observed at intersections or deduced from data about vehicle length in the country the congestion speed w hardly varies and therefore can often be set at −5 m/s. Another reason, as for the widespread use of Gaussian distributions in Statistics, can be the simplicity of the following derivations using the triangular fundamental diagram. Finally, the triangular fundamental diagram can well account for most traffic phenomena.

Continuum models can be derived from the natural conservation law, i.e. that no vehicle disappears. The following derivations can hold regardless of the model.

Supposing that no entry or exit exists between the points $x_1$ and $x_2$, conservation of the vehicle states that $$\frac{\partial}{\partial t} \int_{x_1}^{x_2} k(x, t) \, dx = q(x_1, t) - q(x_2, t) \quad (2)$$

A more sophisticated integral form of the conservation law can be derived. In the time-space domain, the number of vehicles inside a closed curve C remains constant (still with no entry or exit). Therefore $$\int_C -k\,dx + q\,dt = 0 \quad (3)$$

Using the divergence theorem, we obtain $$\int_D \left( \frac{\partial k}{\partial t} + \frac{\partial q}{\partial x} \right) dx\,dt = 0 \quad (4)$$

where D is the domain enclosed by the curve C. Hence the differential form of the conservation law:

$$\frac{\partial k}{\partial t} + \frac{\partial q}{\partial x} = 0 \quad (5)$$

Solutions of equation (2) can be discontinuous whereas those of equation (5) cannot. Some discontinuous phenomena emerge in traffic (at a macroscopic scale), e.g. shock waves, another relationship can be added to equation (5) to handle discontinuities, for example the Rankine-Hugoniot condition on shock waves that can be derived from the first integral form of the conservation law $$\dot{x}(t) = [q]/[k] \quad (6)$$

where x(i) stands for the path of the shock wave. Continuum traffic theories can be based on equations (5) and (6). The LWR model makes the assumption that relationships verified by stationary and homogeneous traffic hold under any traffic condition.

Denote by q=Q(k) the function associated to the fundamental diagram. The partial differential equation (PDE) (5) becomes $$\frac{\partial k}{\partial t} + Q'(k) \frac{\partial k}{\partial x} = 0 \quad (7)$$

and the Rankine-Hugoniot condition (6)

$$\dot{x}(t) = Q(k)/[k] \quad (8)$$

The process of queuing and discharging at an intersection can be studied based thereupon.

Consider a single-lane road represented by the interval $[0, x_e]$. The initial density is constant, $k(x,0)=k_0<k_j$, and the upstream boundary condition is set to maintain this density over time, $q(0, t)=Q(k_0)$. The end of the road is regulated by a traffic signal initially set to red and turning green at $t_g$.

A solution of the LWR PDE (7) can be combined with these initial and boundary conditions to arrive at the physical solution. This problem can be analytically solved. For example, the equivalent Hamilton-Jacobi problem can be utilized for the analytical analysis. Nevertheless, the physical solution can be constructed with only basic knowledge.

Uniform and constant density functions can be solutions to the LWR PDE (7). Knowing that piecewise constant initial and boundary conditions can yield solutions made of uniform and constant regions separated by shock waves, the physical solution can be deduced. The solution can comprise, for example, three regions: the traffic undisturbed by the signal (region 1) at density $k_0<k_j$; the queue (region 2) at density $k_j$; and where the vehicles come out of the queue (region 3) at maximum flow rate $q_m$ and density $k_c$. Exemplary regions are depicted in the triangular fundamental diagram of FIG. 2.

From region 2 to region 3, the vehicles come out of the queue and start again. The speed of this rarefaction wave can be given by the Rankine-Hugoffiot condition (8):

$$\dot{x}(t) = \frac{q_m - 0}{k_c - k_j} = w < 0.$$

The congestion speed w defined in the triangular fundamental diagram is thus the speed of a discharging queue.

From region 1 to region 2, the vehicles reach the beginning of the queue and stop. The speed of the shock wave is:

$$\dot{x}(t) = \frac{0 - Q(k_0)}{k_j - k_0}.$$

If $k_0<k_c$, the shock wave speed is superior (inferior in absolute value) to the congestion speed w. Conversely, if $k_0 \geq k_c$, the shock wave speed is w, and the queue never dissipates.

From region 1 to region 3, the speed of the boundary is $$\dot{x}(t) = \frac{q_m - Q(k_0)}{k_c - k_0} = v_f$$

if $k_0<k_c$. Since $v_f$ is also the speed of the vehicles, the two regions do not exchange vehicles; this boundary is not a shock wave. If $k_0 \geq k_c$, the two regions are separated by region 2 (the queue never dissipates).

Figure 3:
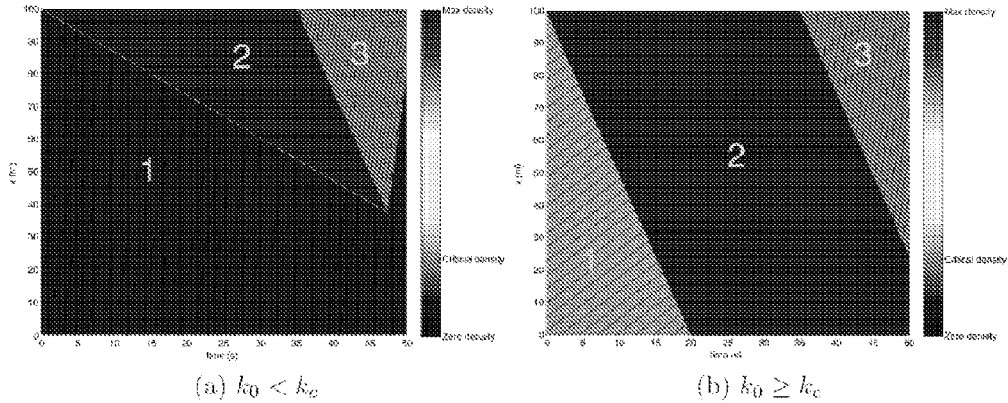
FIG. 3 illustrates an LWR model solution for a signalized intersection and vehicle trajectories.

FIG. 3 shows an analytical solution for a signalized intersection. The black lines depicted represent vehicle trajectories.

A first step for signal timing estimation can be to convert raw GPS probes into vehicle trajectories compatible with the local road network. A path inference filter can be used to perform this task.

The path inference filter can be decomposed into a few steps. GPS measurements an be mapped onto a set of possible candidate states on the road network in a map-matching step. Admissible paths between candidate states can be computed during path discovery. Filtering can yield different results such as the best path for each vehicle or posterior distribution over the trajectories. The best path for each vehicle can be retained, which will be referred to in the following developments as the trajectory of the vehicle. The systems and methods described herein can be been implemented, for among other reasons, to fine-tune parameters of the filter.

A road network can be described with a directed graph $N=(V, \epsilon)$ whose nodes are the street intersections and the edges are the streets, or links. Each vehicle can be located using a link l and an offset o on that link. The state of a vehicle can be its location.

$$x=(l,o) \qquad (9)$$

A GPS observation can be mapped onto the road using a Bayesian formulation. The distribution of the actual vehicle state, knowing the GPS observation, can be denoted as $\pi(x|g)$. This distribution might not be available whereas the reverse distribution $\omega(g|x)$ is as it only need depend on the characteristics of GPS emission. Introducing a prior distribution $\Omega(x)$ of vehicles on the road, the two former distributions can be linked by Bayes' rule:

$$\pi(x|g) \propto w(g|x)\Omega(x) \qquad (10)$$

Choices are available for selecting candidate projection points for each GPS observation. One can be to grid each link. Another choice can be to select the best candidate on each link $l_i$, $$\forall i, o_i^* = \arg\max_o \pi(o | g, l = l_i) \qquad (11)$$

Information can often be unavailable regarding the prior distribution $\Omega(x)$. Thus, a uniform prior distribution can be assigned to each link selected.

$$\forall i, o_i^* = \arg\max_o \omega(g | o, l = l_i) \qquad (12)$$

The distribution function $\omega$ represents the noise in GPS observations. It can be described using a Gaussian noise model in which the standard deviation $\sigma$ is chosen using an expectation-maximization algorithm.

Trajectory inference of a single vehicle can be considered to, for example, simplify notations. Each GPS observation $g^t$ can be mapped onto a set of $I^t$ different candidates $x^t = x_1^t \ldots x_{I^t}^t$. The $J_t$ paths that a vehicle can follow can be computed to go from a projection $x_i^t \in x^{t+1}$ to a projection $x_{i'}^{t+1} \in x^{t+1}$. The set of possible paths between $x^t$ and $x^{t+1}$ can be denoted $p^t$. This exploration step can be done in finite time as the length of candidate paths is limited by the time interval between t and t+1 and the speed limitation. A graph search can performs this task.

A trajectory can be described by a sequence of projections and paths:

$$\tau = x_1 p_1 x_2 \ldots p_{i-1} x_i \qquad (13)$$

where $x_1$ is in $x^1$, $p_1$ in $p^1$, etc. Taking this, a goal can be to find the best trajectory according to one or more preferred criteria.

The trajectory reconstruction problem can be reduced, as thus far described, to a discrete selection problem among a set of at most $(\Pi_{t=1}^{t-1} I^t J^t) I^t$ possible trajectories. A potential can be defined, and the best trajectory can be selected according to this potential. Some natural and not so restrictive Markov assumptions can simplify the problem.

Firstly, the path p followed between two points $x_{start}$ and $x_{end}$ can depend only on the start and end points and the path itself. Secondly, the paths taken by the vehicle before and after a time t can be independent of the GPS measurement $g_t$ if, e.g., the actual vehicle state x, is known. These assumptions can endow the trajectory reconstruction problem with a conditional random field structure upon which a score or potential function can be defined.

Since each GPS measurement g is created from a vehicle state x with the distribution $\omega(g|x)$, each candidate vehicle state can be assigned the score $\omega(g|x)$. Every path p on the road network can be assigned a probability $\eta(p)$ which can represent driver behavior. Some possible features are the length of the path, the number of crossed intersections, the preference for right turns, etc. Not all possible features need to be considered. For example, the length of the path can be used to the exclusion of others.

The weights pondering those features (GPS noisy observation model $\omega(g|x)$ for the projections x and path features $\eta(p)$ for the paths p) can be chosen using, e.g., an expectation-maximization algorithm that maximizes the expectation (e.g. over all possible trajectories) of the potential. Not every path and projection is compatible. Compatibility can be formally expressed in the following:

$$\delta(x, p) = \begin{cases} 1 & \text{if the path } p \text{ starts at point } x \\ 0 & \text{otherwise} \end{cases} \quad (14)$$

$$\bar{\delta}(p, x) = \begin{cases} 1 & \text{if the path } p \text{ starts at point } x \\ 0 & \text{otherwise} \end{cases} \quad (15)$$

The score associated with a sequence of observations $g^{1:T}=g^1 \ldots g^T$ and trajectory $\tau=x^1 p^1 \ldots x^T$ is $$\phi(\tau \mid g^{1:T}) = \left[\prod_{t=1}^{T-1} \omega(g^t \mid x^t)\delta(x^t, p^t)\eta(p^t)\bar{\delta}(p^t, x^{t+1})\right]\omega(g^T \mid x^T) \quad (16)$$

The function $\phi$ is called the potential function and a trajectory $\tau$ is compatible with a sequence of GPS observations $g^{1:T}$ if $\phi(\tau|g^{1:T})>0$.

Figure 4:
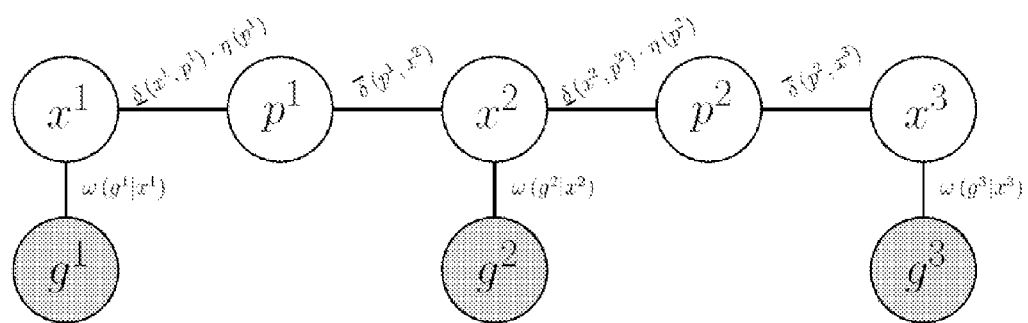
FIG. 4 depicts an exemplary conditional random field.

FIG. 4 illustrates an example of a conditional random field. The gray nodes indicate observed data. The aim in this example is to find the sequence $\Sigma=x^1 p^1 x^2 p^2 x^3$ that most likely produced the observed data. i.e. the sequence that maximizes the product of all factors between the variables (potential function). As can be seen, the potential function is the product of all values of the links of the graph, i.e. the factors between the variables. The partition function can be:

$$Z = \sum_\tau \phi(\tau \mid g^{1:T}) \quad (17)$$

Thus the following relationship between the potential function $\phi$ and the probability of a trajectory $\tau$:

$$\pi(\tau \mid g^{1:T}) = \frac{\phi(\tau \mid g^{1:T})}{Z} \quad (18)$$

From the conditional random field defined in last section, we wish to infer the most likely trajectory $\tau$:

$$\tau^* = \arg\max_\tau \pi(\tau \mid g^{1:T}) \quad (19)$$

$$= \arg\max_\tau \phi(\tau \mid g^{1:T}) \quad (20)$$

The number of paths to consider can grow exponentially with the length of the sequence and the number of candidate projections for each GPS observation. Nonetheless, the computation can be done using a standard dynamic programming algorithm such as the Viterbi algorithm.

To learn the weights given to the different features of trajectories, the conditional marginals $\pi(x^{ij}|g^{1:T})$ and $\pi(p^t|g^{1:T})$ must be computed. This also can be done using dynamic programming such as the forward-backward algorithm.

Denote by $\phi^*(g^{1:T})$ the maximum value of the potential function over all possible trajectories according to the observation sequence $g^{1:T}$, then $$\phi^*(g^{1:T}) = \max_\tau \phi(\tau \mid g^{1:T}) \quad (21)$$

Consider a partial trajectory up to time t, $\Sigma^{1:t}=x^1 p^1 \ldots x^t$. The associated partial potential $\phi(\tau^{1:t}|g^{1:t})$ is $$\phi(\tau^{1:t} \mid g^{1:t}) = \quad (22)$$
$$\omega(g^1 \mid x^1)\prod_{t'=1}^{t-1} \delta(x^{t'}, p^{t'})\eta(p^{t'})\bar{\delta}(p^{t'}, x^{t'+1})\omega(g^{t'+1} \mid x^{t'+1})$$

Here, a structure fit for dynamic programming arises. The maximum potential function for trajectories ending at the projection $x_i^t$ can be defined as:

$$\phi_i^t = \max_{\tau^{1:t}=x^1 p^1 \ldots x^{t-1} p^{t-1} x_i^t} \phi(\tau^{1:t} \mid g^{1:t}) \quad (23)$$

Immediately yielding:

$$\phi^* = \max_{i \in [1, I^T]} \phi_i^T \quad (24)$$

An inductive identity to compute the partial potentials can be derived:

$$\phi_i^1 = \omega(g^1 \mid x_i^1) \quad (25)$$

$$\forall t, \phi_i^{t+1} = \max_{\substack{i' \in [1, I^t] \\ j' \in [1, J^t]}} \phi_{i'}^t \delta(x_{i'}^t, p_j^t)\eta(p_j^t)\bar{\delta}(p_j^t, x_i^{t+1})\omega(g^{t+1} \mid x_i^{t+1}) \quad (26)$$

The maximum $\phi^*$ of the potential function can be computed efficiently this way. From at most $(\Pi_{i=1}^{t-1} I^t J^t) I^t$ trajectories to consider, the number of computations to $$O\left(T \cdot \max_t I^t \cdot \max_t J^t\right)$$

can be reduced. The trajectory $\tau$ that realizes this maximum value can be found by, e.g., tracing back the computations.

Some limitations of map-matching in general can now be addressed. The path inference filter can serve for map-matching due to its efficiency. Nevertheless, implementing the signal timing estimation method can be done using any map-matching algorithm, and improvement in map-matching quality can transmit to signal timing estimation.

The path inference filter is extremely efficient at selecting the best path, i.e. the best sequence of links followed by the vehicle. On the contrary, it performs less than extremely efficiently at determining the right projections of GPS probes along the best path. This can be due to noisy emission of GPS positions by probe vehicles. It can also be more inherent to the problem of map-matching in a global sense than related to the design of the path inference filter itself. To estimate signal timing parameters, information from the set of probe vehicle trajectories can be extracted. Having the right projections along the trajectory can be important for some present embodiments.

Figure 5:
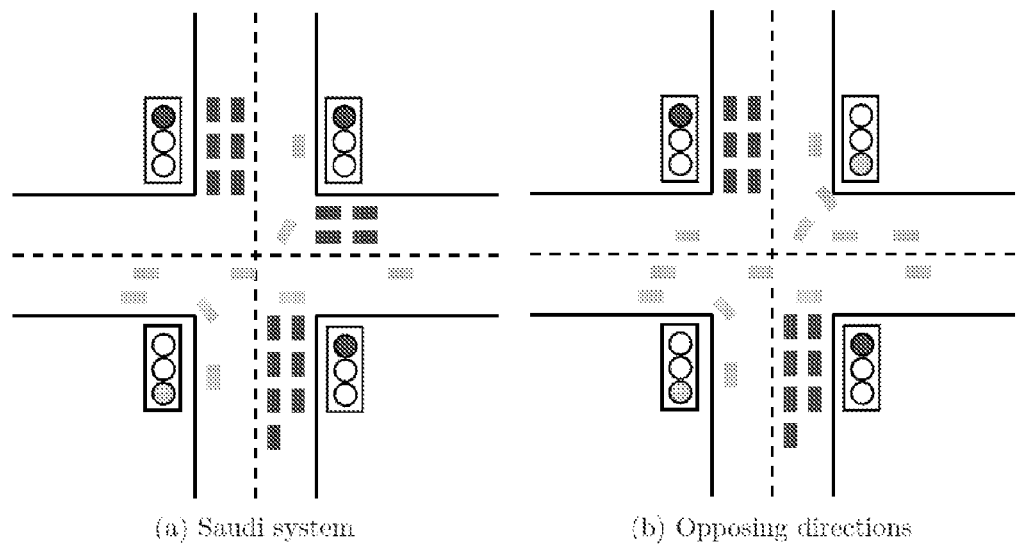
FIG. 5 depicts different types of exemplary signalized intersection regulation systems.

Traffic lights and driving rules can depend on legislation and practices of administrative agencies. FIG. 5 depicts an exemplary traffic signal cycle, as an example from Saudi Arabia. Incoming links signals turn green successively, i.e. the traffic light at a typical intersection has four different possible states, each one corresponding to another discharging incoming link. This practice differs from the more common association between two opposing directions. Nonetheless, a person of ordinary skill in this art would readily recognize that implementing present embodiments with other traffic control practices would demand very few and ordinary changes and, in the cases where the number of signal parameters is reduced, the complexity would accordingly diminish from this example.

Figure 6:
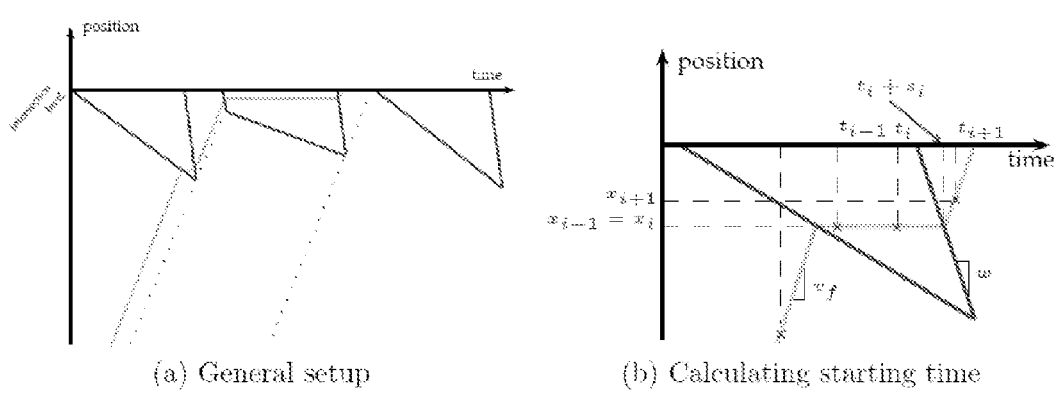
FIG. 6 illustrates a queuing and discharging theoretical model.

FIG. 6 depicts triangular approximation in a process of queuing and discharging. An assumption made in this example is allowing the cycle lengths and phases of the traffic lights to be constant, i.e. pre-timed signals. Some embodiments can benefit from the periodicity of signal patterns. Application to time-varying traffic lights can have some effect on performance and reliance. The queuing and discharging processes can be derived from the LWR model discussed herein. Assume momentarily also that queues do not spillover to upstream intersections, i.e. heavy congestion. FIG. 6a on depicts the process of queuing and discharging at a signalized intersection under non-saturated traffic conditions. The solid line in FIG. 6a shows a vehicle trajectory: first driving at free-flow speed $v_f$, it encounters a queue, waits in the queue, restarts driving at free-flow speed and eventually passes the intersection after waiting in another queue. A vehicle cannot change its speed instantly as assumed by the LWR model. In practice, a vehicle will accelerate after getting out of a queue and seldom reach the free-flow speed. This can be compensated by introducing a small acceleration phase near a queue. Nevertheless, this improvement need not be essential as it generally only reduces error from a few tenths of a second. It can be imposed that the duration between two consecutive GPS emission timestamps is inferior to the traffic lights green phases durations.

Estimates of the times when the signal turns from red to green using vehicle states (moving or stopped) can be inferred. While a vehicle is driving on a given link, it can emits its position N times, thus giving samples of its trajectory $(x_i, t_i)_{\{i=1, \ldots, N\}}$. From these, the stopping time $s_i$, i.e. the time during which the vehicle was stopped between $t_i$ and $t_{i\pm1}$, can be deduced. As the vehicle can generally be considered either stopped or driving at free-flow speed $v_f$ (according to the LWR model), a direct formula for the stopping time is $$s_i = t_{i+1} - t_i - \frac{x_{i+1} - x_i}{v_f} \quad (27)$$

Performance can be improved by, e.g., considering a phase of linear acceleration when a vehicle restarts. The stopping time becomes $$s_i = t_{i+1} - t_i - f(x_{i+1} - x_i) \quad (28)$$

where $$f(x) = \begin{cases} \sqrt{\frac{2x}{a}} & \text{if } \sqrt{\frac{2x}{a}} \le \frac{v_f}{a} \\ \frac{x}{v_f} + \frac{v_f}{2a} & \text{if otherwise} \end{cases} \quad (29)$$

As an example, the acceleration phase can be 6 s for a vehicle to reach the free-flow speed $v_f$, i.e. $v_f/a=6$ s. Vehicles that come out of a queue between $t_i$ and $t_{i+1}$ can be detected. The vehicles were stopped between $t_{i-1}$ and $t_i$ and drive between $t_i$ and $t_i+1$. Using stopping times, the following rule can be found: a vehicle comes out of a queue between $t_i$ and $t_{i+1}$ if $$s_{i-1} = t_i - t_{i-1} \text{ and } s_i < t_{i+1} - t_i \quad (30)$$

Some vehicles coming out of a queue might be undetected ($s_{i-1} < t_i - t_{i-1}$). This can happen for example when a vehicle enters the queue just before the signal turns to green. On FIG. 6a, the vehicle represented by the solid line is in that configuration when going through the first queue. In the second queue however, the vehicle can be detected when it restarts driving.

As stated before, the duration between two consecutive GPS emission timestamps can be assumed inferior to traffic lights parameters. From this it can be deduced that it is impossible that a vehicle emits its position from a queue and at the next timestamp form another queue. Therefore, the vehicle precisely leaves the queue at time $t_i+s_i$. FIG. 6b illustrates the situation.

The LWR model assumes that wave speed w is constant. From the time when the vehicle leaves the queue $t_i+s_i$ and its distance to the end of the link l−x, he estimation of the time when the signal turns from red to green can be derived:

$$b = t_i + s_i + \frac{l - x_i}{w} \quad (31)$$

Note that w<0. The vehicle may not get to free-flow speed immediately. Its actual speed v(t) can remain inferior to $v_f$. Nevertheless, good results can be yielded using this approximation.

It has been assumed that the congestion wave speed w was an input to the model. The value however can range, for example from −4 to −10 mph (−2 to −22 m/s), and can scarcely vary in a given locality or region of the world. Nevertheless, any unexpected variation can reduce performance, considering the central role of the congestion wave speed in our method. Therefore, we propose a method to determine the congestion wave speed w providing there are enough observations on the studied link.

Figure 7:
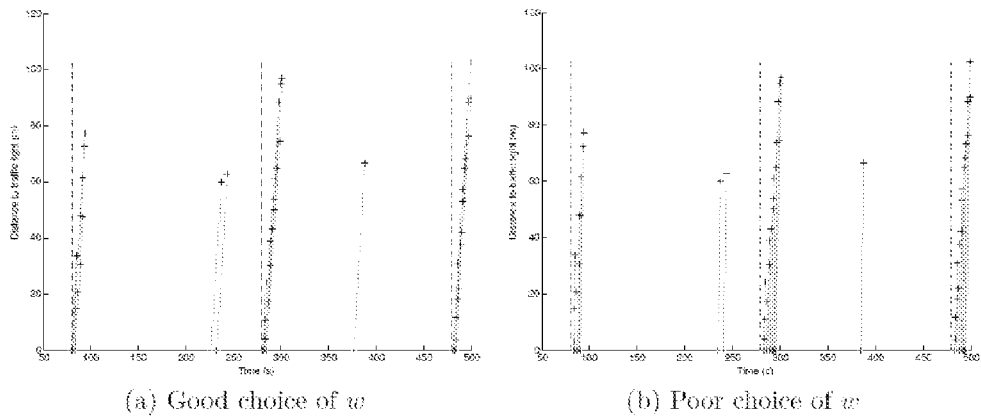
FIG. 7 illustrates influence of congestion wee speed w in estimation of signal transition times.

FIG. 7 illustrates influence of the congestion wave speed w in the estimation of signal transition times. Vehicles restarting to drive (crosses) can give estimates of the signal transition times of the traffic light. The actual transitions from red to green on the given link are represented by the dashed lines. The first output shown in FIG. 7a illustrates a good choice of congestion wave speed w, resulting in a good estimation of the signal transition times. On the other hand, FIG. 7b shows a case where the congestion wave speed has been poorly tuned. The projections are scattered instead of concentrated on the actual signal transition times. Provided we have a sufficient number of vehicles on road, the best congestion wave speed w is that giving clusters of projections, as can be seen on FIG. 7a. Thus we maximize the following function to estimate w.

$$F(w) = \sum_{i<j} \exp(-(b_i(w) - b_j(w))^2) \qquad (32)$$

where $(b_i)_i$ represents the estimates given by vehicles popping out of the queue and restarting.

Consider an intersection and its incoming links $L_1, \ldots, L_L$. Vehicles on link $L_l$ can give a set of estimates of red to green transition times $(b_i^l)_{i=\{1, \ldots, N^i\}}$. Signal parameters that maximize a score function based on those estimates can be found.

The setting of the traffic lights of an intersection can be defined by L+1 parameters. L parameters $g_1, \ldots, g_L$, for the duration of the green phases of the L incoming links and an offset o to account for an unknown starting time of a cycle.

Figure 8:
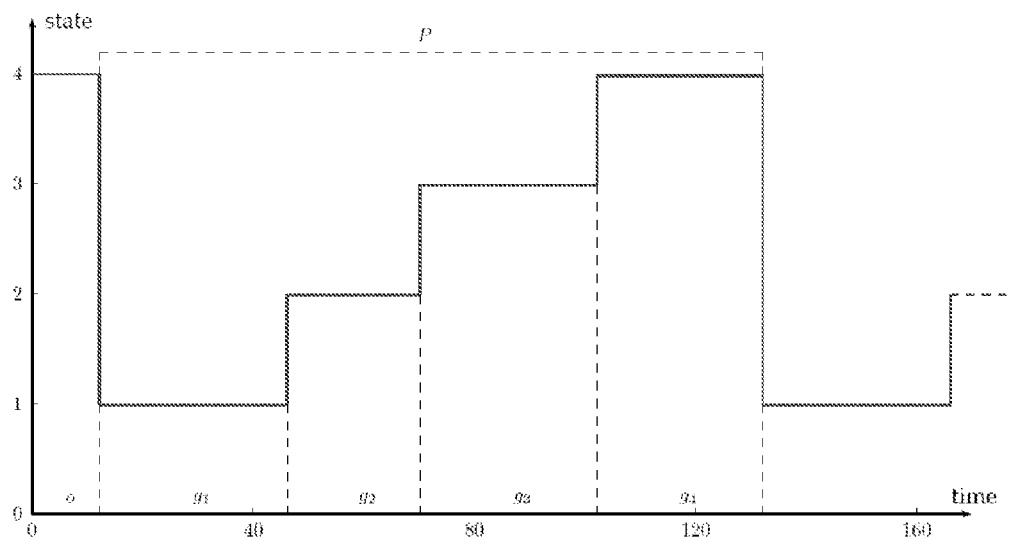
FIG. 8 illustrates signal cycles function.

FIG. 8 describes a shape of the signal cycles function. Denote by $P=\Sigma_l g_l$ the period of signal cycles. Transition times $h_k^l$ when the signal of link $L_l$ turns from red to green can be deduced:

$$h_k^i = o + kP + \sum_{m=1}^{l-1} g_m, k \in \mathbb{Z} \qquad (33)$$

Using these notations, a set of parameters $(o, g_l, \ldots, g_L)$ can be described as a solution of this maximization problem:

$$(o^*, g_1^*, \ldots, g_M^*) = \underset{(o, g_1, \ldots, g_M)}{\operatorname{argmin}} S(o, g_1, \ldots, g_M) \qquad (34)$$

where the score function S is $$S(o, g_1, \ldots, g_L) = \prod_{i=1}^{L} \sum_{i=1}^{N_t} \exp\left(-\frac{1}{\kappa^2} \min_{k \in \square}(h_k^j - b_i^j)^2\right) \qquad (35)$$

This score function can be maximized in an L+1 dimensional space. The search space can be narrowed down based on simple considerations. For example, the periodicity of the problem can allow a reduction of the search on the offset o to the interval [0, P]. Moreover, engineering knowledge can enable setting boundaries on the values of the parameters $g_l, \ldots, g_L$.

Note that the order in which the incoming links signals turn from red to green is assumed to be known for illustrative purposes. In the general case, an investigation all possible permutations can be made. However, since circular permutations of a same order are taken into account by the offset o, only (L, ... 1)! orders can be checked instead of L!. For example in a common system wherein opposing lights are green at the same time, only one order must be computed (the notion of order can be considered irrelevant for a periodic function of two states). Using the exemplary traffic control system described above, six orders are to be explored.

Resolution of the maximization problem is an instance of constrained nonlinear optimization, which can be solved in the log-domain, for example to avoid underflow issues. It can be solved using a number of optimization paradigms. A gradient descent can be utilized, for example, while paying particular attention to the piecewise continuous aspects of the partial derivatives.

The search space can be derived from engineering knowledge. For example, having a bounding interval $[g_{min}, g_{max}]$ on the green phases duration times can be assumed. Moreover, based on the exemplary periodicity of the problem, the offset o can be searched within [0,P] where $P=\Sigma_l g_l$. Thus, the search space can be $$\begin{cases} g_{min} \leq g_l \leq g_{max} & \forall l \in \{1, \ldots, L\} \\ 0 \leq o \leq \sum_{j=1}^{L} g_l \end{cases} \qquad (36)$$

Regarding partial derivatives and continuous regions, denote the number of cycles that best matches the i-th estimate $b_i^l$ of signal transition time on link $L_l$ as $\tilde{k}_i^l$:

$$\tilde{k}_i^l = \underset{k \in \square}{\operatorname{argmin}} (h_k^j - b_i^j)^2 \qquad (37)$$

The logarithmic score function can be written as $$\log S(o, g, \ldots, g_L) = \sum_{i=1}^{L} \log \sum_{i=1}^{N^i} \exp\left(-\frac{1}{\kappa^2}\left(h_{\tilde{k}_i^l}^j - b_i^j\right)^2\right) \qquad (38)$$

It is continuous and piecewise differentiable with continuous partial derivatives within a certain set of regions. Within those regions, the partial derivatives with respect to the parameters of the signal cycles function can be $$\frac{\partial \log S}{\partial o} = -\frac{2}{\kappa^2} \sum_{i=1}^{L} \sum_{i=1}^{N^i} p_i^j \cdot \left(h_{\tilde{k}_i^l}^j - b_i^j\right) \qquad (39)$$

and $$\frac{\partial \log S}{\partial g_m} = -\frac{2}{\kappa^2} \sum_{i=1}^{L} \sum_{i=1}^{N^i} p_i^j \cdot \left(h_{\tilde{k}_i^l}^j - b_i^j\right) \cdot \left(\tilde{k}_i^j + 1(m < l)\right) \qquad (40)$$

where the weights $p_i^l$ can be given by $$p_i^j = \frac{\exp\left(-\frac{1}{\kappa^2}\left(h_{\tilde{k}_i^l}^j - b_i^j\right)^2\right)}{\sum_{j=1}^{N^i} \exp\left(-\frac{1}{\kappa^2}\left(h_{\tilde{k}_i^l}^j - b_i^j\right)^2\right)} \qquad (41)$$

The separations between the continuous regions mentioned above are hyperplanes. It can be derived that each estimate $b_i^l$ produces a set of hyper-planes:

$$2(o - b_i^j) + (2k + 1)\sum_{m=1}^{L} g_m + \sum_{m=1}^{l-1} g_m = 0, k \in \mathbb{Z} \qquad (42)$$

Gradient descent can yield the maximum of the logarithmic score log S within the continuous region containing the starting point of the algorithm. Yet, it may happen that the global maximum and the chosen starting point are not within the same continuous region. To avoid this, several instances of gradient descent can be performed from randomly chosen starting points.

Using the shape of separations between continuous regions (42) and the search space (36), a theoretical minimum number of iterations to be run in order to reach the global maximum, with a user-specified risk level, can be derived. Such a technique merely relies on two empirical rules: More discontinuities are produced as the number of observations (estimates) is increased. And, the estimates produced by the observed vehicles are very similar when the noise is low, and therefore, the continuous region containing the global maximum can be bigger. As a result, the minimum number of iterations can increases with the noise.

A particular advantage of gradient descents can be the speed at which they perform an optimization. For example, hundreds of iterations can be performed as implemented herein in less than 10 seconds on a 2.5 GHz laptop using MATLAB Optimization Toolbox, which can be sufficient in many circumstances. For example, discrepancies in results have been found in such an example to occur below 20 iterations.

For illustration to a person of skill in the art, and not by way of limiting any embodiment to such specific illustration, an exemplary method embodiment is described now with respect to multiple microscopic simulation data sets. Results therefrom can be produced with Vissim (a commercial traffic simulator developed by PTV Group). Restrictions on the version of the product utilized constrained results to 10-minute data sets, but this is not intended to be a limitation on the data sets contemplated and is presented here merely as an example. Simulations can use simple pre-timed crossroads with three different signal timing settings (for each of these configurations, 5 traffic simulations were run:

A sequence of green phases with duration times of 40 s, 40 s, 60 s, and 60 s. Hence, there can be three cycles in one simulation of 10 minutes.

A sequence of green phases with duration times of 40 s, 60 s, 70 s, and 30 s, with 3 cycles per simulation.

A sequence of green phases with duration times of 70 s, 60 s, 90 s, and 80 s, with 2 cycles per simulation.

A basic investigation of the performance of the path inference filter is discussed, without a thorough analysis of the quality of map-matching using the exemplary algorithm, in light of a few benefits and shortcomings with respect to the particular needs of the example. An analysis of the results of according to different sets of parameters and traffic conditions is also discussed.

To compare two different signal timings over n cycles, a root-mean-square error (RMSE) can be utilized:

$$RMSE((o^1, g_1^1, \ldots, g_L^1), (o^2, g_1^2, \ldots, g_L^2)) = \sqrt{\frac{1}{nL}\sum_{k=0}^{n-1}\sum_{l=1}^{L}\left(o^1 - o^2 + k\sum_{m=1}^{L}(g_m^1 - g_m^2) + \sum_{m=1}^{l-1}(g_m^1 - g_m^2)\right)^2} \quad (43)$$

Figure 9:
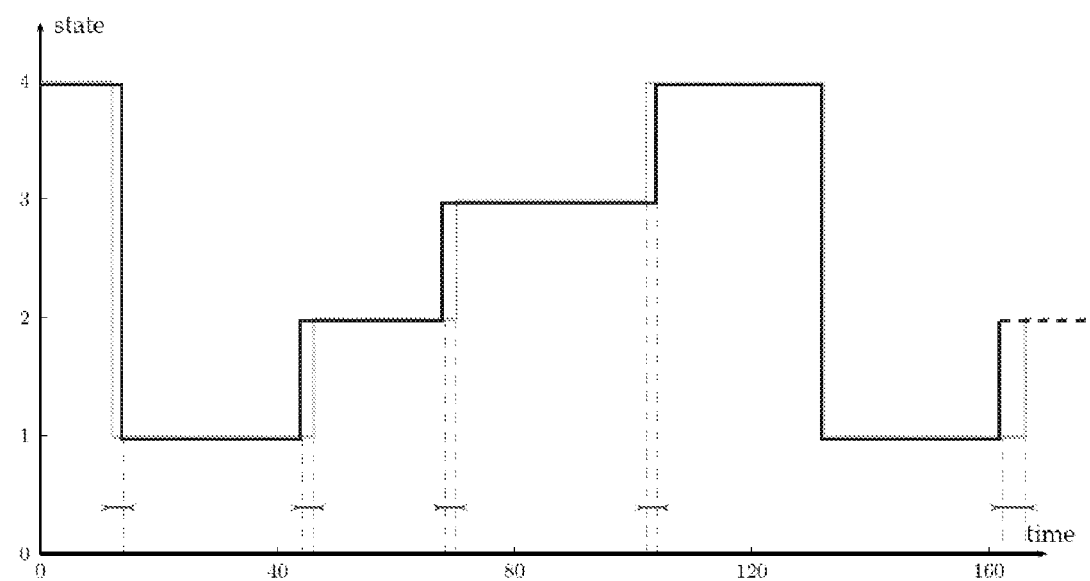
FIG. 9 shows a comparison between two signal cycles function and root-mean-square error.

This is the quadratic mean of the errors between the starting times of green phases. FIG. 9 shows the comparison between two signal cycles function; the RMSE is the square root of the average of the squares of the red intervals. This measurement of the error is provided as an example, rather than a simple comparison between parameter vectors, as it sufficiently captures functional aspects of the problem. For example, consider an actual signal tinning p=(0, 40, 40, 60, 60) and its estimation $\hat{p}$=(0, 38, 42, 60, 60). RMSE can capture, for example, that the overestimated duration time 42 s for the second green phase is actually a compensation for the underestimated duration time 38 s of the first green phase (or vice-versa). On the other hand, direct comparison between p and $\hat{p}$ with $L^2$ norm counts the error twice.

Performance of the signal timing estimation algorithm can be tested on three different signal configurations, as detailed herein. For each configuration, five simulations are run by way of example.

Figure 10:
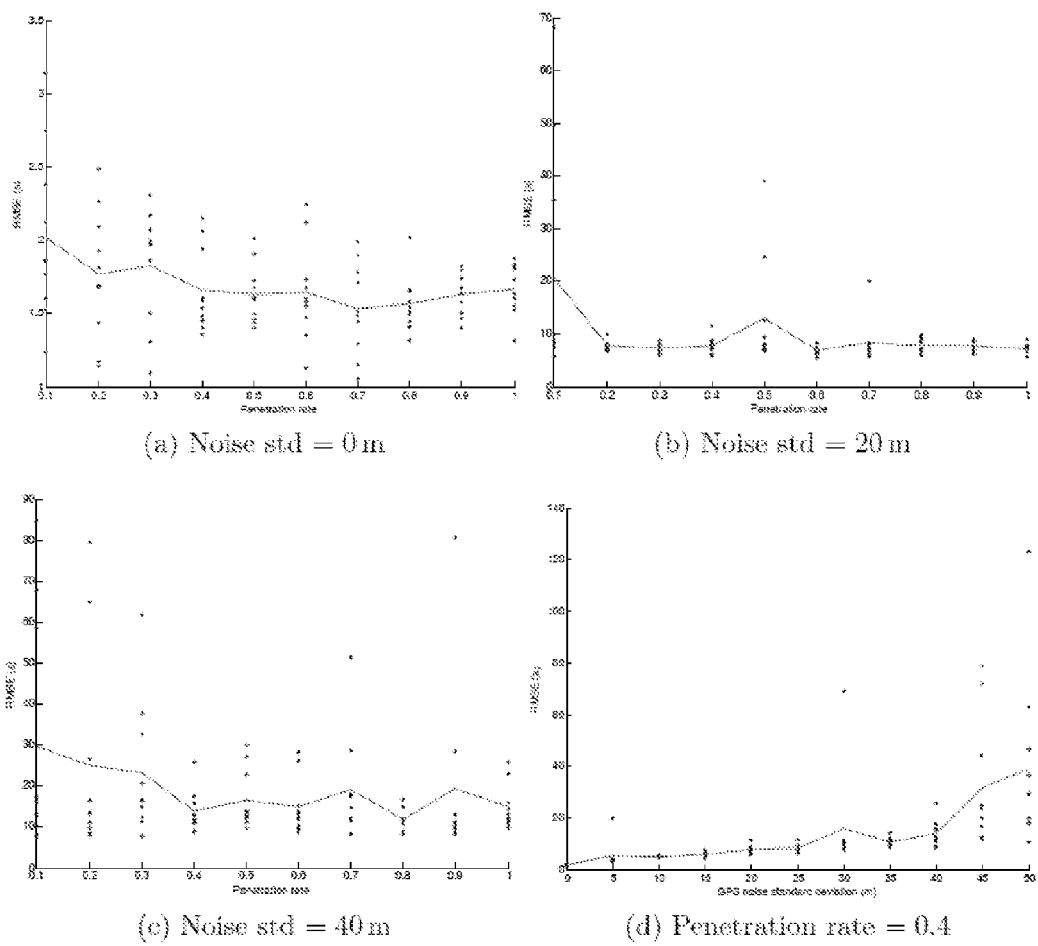
FIG. 10 shows signal timing estimation performance.
Figure 11:
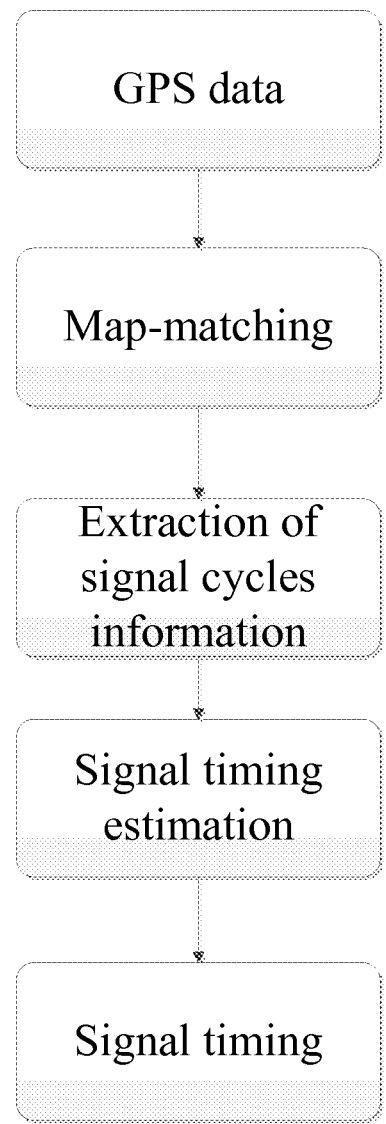
FIG. 11 depicts a flow diagram of an exemplary embodiment.

FIG. 10 shows results and the influence of the two environmental parameters: the penetration rate and the strength of the noise. Since the noise can be approximated by a Gaussian distribution, a relevant parameter is the standard deviation.

The influence of noise on the performance of the algorithm can be seen in FIG. 10d. When no noise is applied, state-of-heart results are obtained (RMSE≈1.7 s). Up to a standard deviation of 35 m, the error increases slowly to reach an average of 10 s. Nevertheless, aberrant results appear, one at 5 m and one at 30 m, and from 40 m on, and the output of the algorithm cannot be trusted anymore. This is for reasons described herein, specifically map-matching alone can sometimes returns the good trajectory, but it inaccurately projects the GPS observations on this trajectory under strong noise, which can lead to a poor estimation of queuing and restarting vehicles and bad overall results.

The influence of the penetration rate for different noise levels is shown on FIGS. 10a to 10c. It is clear that the influence of the penetration rate can increase with the noise level. For a noise of std=0 m, the error can be reduced by less than 25% when the penetration rate increases. However, the RMSE can double or triple with the penetration rate when the noise standard deviation is higher, see for example FIGS. 10b and 10c.

A map-matching step of present embodiment can be a source of error. Thus, it can be beneficial to finished and implemented systems to more precisely determine vehicle positions along their trajectories at the time of GPS emissions. This can improve quality of estimates of red to green transition times, since they are based on the identification of stopping and restarting vehicles. Improving map-matching can also reduce the dependency of performance on penetration rate. Although in some specific embodiments, the GPS sampling period is described as limited to being inferior to the minimum green phase duration, this limitation can be relaxed to account for, e.g., floating vehicle data sources having sampling periods superior to one minute. Although in some specific embodiments, simple intersections are shown, the methods and systems described herein are not limited to such examples. For example, more than one signal per incoming link can be extracted and utilized. For further example, a distinction between left/right-turns and through signals can be incorporated. Many signals can be actuated according to traffic evolution. Therefore, relaxing the periodicity assumption and allowing signal timing parameters to vary over time can be important in certain implementations. This can be done without much effort, for example, by modifying the score function and/or indexing the parameters with cycles.

In a general context, embodiments can be implemented in an ITS. The ITS can further integrate, for example, an Eulerian and/or Lagrangian sensor network for traffic flow monitoring and for flood sensing. The traffic flow monitoring system can be a hybrid Eulerian-Lagrangian system that operates on a wireless network or can incorporate hardwired aspects. The Eulerian sensors can yield traffic information around their location. These can include passive infrared sensors and ultrasonic sonar sensors. The Lagrangian sensors can use of some probes equipped with transceivers disposed in vehicles.

The flood sensing subsystem can utilize mobile sensor networks based on, for example, unmanned aerial vehicles. Not only can flood sensing data aid in recognizing, addressing, and/or avoiding flooded areas on roadways, it can save lives especially in regions where rainfall is rare but intense such as arid regions.

The additional subsystems of the ITS can further improve traffic monitoring and aid regulation, which can diminish ecological impacts of global transportation and can reduce transportation times for everyone or for specific vehicle types such as commercial and/or emergency vehicles. Solutions to this public and economic issue are sought by both the public and private sectors.

An ITS can regroup applications that aim at providing innovative services such as enabling users to be better informed and make smarter use of transportation networks. Both private companies and public administrations can recognize the importance of ITS to reduce transportation times, costs, and pollution.

The various traffic signal estimation techniques, methods, and systems described herein can be implemented in part or in whole using computer-based systems and methods. Additionally, computer-based systems and methods can be used to augment or enhance the functionality described herein, increase the speed at which the functions can be performed, and provide additional features and aspects as a part of or in addition to those described elsewhere in this document. Various computer-based systems, methods and implementations in accordance with the described technology are presented below.

An image reconstructing system can be embodied by the a general-purpose computer or a server and can have an internal or external memory for storing data and programs such as an operating system (e.g., DOS, Windows 2000™, Windows XP™. Windows NT™, OS/2, UNIX or Linux) and one or more application programs. Examples of application programs include computer programs implementing the techniques described herein for lyric and multimedia customization, authoring applications (e.g., word processing programs, database programs, spreadsheet programs, or graphics programs) capable of generating documents or other electronic content; client applications (e.g., an Internet Service Provider (ISP) client, an e-mail client, or an instant messaging (IM) client) capable of communicating with other computer users, accessing various computer resources, and viewing, creating, or otherwise manipulating electronic content; and browser applications (e.g., Microsoft's Internet Explorer) capable of rendering standard Internet content and other content formatted according to standard protocols such as the Hypertext Transfer Protocol (HTTP). One or more of the application programs can be installed on the internal or external storage of the general-purpose computer. Alternatively, application programs can be externally stored in or performed by one or more device(s) external to the general-purpose computer.

The general-purpose computer or server may include a central processing unit (CPU) for executing instructions in response to commands, and a communication device for sending and receiving data. One example of the communication device can be a modem. Other examples include a transceiver, a communication card, a satellite dish, an antenna, a network adapter, or some other mechanism capable of transmitting and receiving data over a communications link through a wired or wireless data pathway.

The general-purpose computer or server may also include an input/output interface that enables wired or wireless connection to various peripheral devices. In one implementation, a processor-based system of the general-purpose computer can include a main memory, preferably random access memory (RAM), and can also include a secondary memory, which may be a tangible computer-readable medium. The tangible computer-readable medium memory can include, for example, a hard disk drive or a removable storage drive, a flash based storage system or solid-state drive, a floppy disk drive, a magnetic tape drive, an optical disk drive (Blu-Ray, DVD. CD drive), magnetic tape, paper tape, punched cards, standalone RAM disks, Iomega Zip drive, etc. The removable storage drive can read from or write to a removable storage medium. A removable storage medium can include a floppy disk, magnetic tape, optical disk (Blu-Ray disc, DVD, CD) a memory card (Compact-Flash card, Secure Digital card, Memory Stick), paper data storage (punched card, punched tape), etc., which can be removed from the storage drive used to perform read and write operations. As will be appreciated, the removable storage medium can include computer software or data.

In alternative embodiments, the tangible computer-readable medium memory can include other similar means for allowing computer programs or other instructions to be loaded into a computer system. Such means can include, for example, a removable storage unit and an interface. Examples of such can include a program cartridge and cartridge interface (such as the found in video game devices), a removable memory chip (such as an EPROM or flash memory) and associated socket, and other removable storage units and interfaces, which allow software and data to be transferred from the removable storage unit to the computer system.

In some embodiments, the video stream and the extracted image data can be stored in a memory or storage device such as those discussed above. A copy of the extracted image data can be used for processing.

An example of the video image data processing can be symbol (or object) based. Using image processing technique such as color edge detection, a symbol of a screen or an image of the video can be isolated. The symbol can be identified using an object template database. For example, the symbol includes 4 legs and a tail, and when matched with the object template database, the symbol may be identified as a dog. The object template database can be adaptive and therefore, the performance would improve with usage.

Other image data processing techniques may include image extraction, high-level vision and symbol detection, figure-ground separation, depth and motion perception.

REFERENCES

Each of the following references is hereby incorporated by reference in its entirety.

E. S. Canepa and C. G. Claudel. Exact solutions to traffic density estimation problems involving the Lighthill-Whitham-Richards traffic flow model using mixed integer programming. In *Intelligent Transportation Systems (ITSC), 2012 15th International IEEE Conference on*, pages 832-839, 2012.

C. F. Daganzo. *Fundamentals of Transportation and Traffic Operations*. Pergamon, Oxford, 1997.

B. D. Greenshields, J. R. Bibbins, W. S. Charming, and H. H. Miller. *A study of traffic capacity*. Highway research board proceedings, 1935.

Peng Hao, Xuegang Ban, K. P. Bennett, Qiang Ji, and Zhanbo Sun. *Signal timing estimation using sample intersection travel times*. Intelligent Transportation Systems. IEEE Transactions on, 13(2): 792-804, 2012.

T. Hunter, R. Herring, P. Abbeel, and A. M. Bayen. *The path inference filter: model-based low-latency map matching of probe vehicle data*. CoRR, abs/1109.1966, 2011.

T. Hunter, P. Abbeel, and A. Bayen, *The path inference filter: model-based low-latency map matching of probe vehicle data*. arXiv: 1109.1966v2, 20 Jun. 2012.

M. J. Lighthill and G. B. Whitham. *On kinematic waves. ii. a theory of traffic flow on long crowded roads*. Proceedings of the Royal Society of London. Series A. Mathematical and Physical Sciences, 229 (1178): 317-345, 1955.

P. E. Mazaré, A. H. Dehwah, C. G. Claudel, and A. M. Bayen. *Matlab implementation of an exact lwr solver*. Online at traffic.berkeley.edu/project/downloads/lwr-solver. Last accessed: 2013 Jun. 12.

P. E. Mazare, A. H. Dehwah, C. G. Claudel, and A. M. Bayen. *Analytical and grid-free solutions to the Lighthill-Whitham-Richard on traffic flow model*. Transportation Research Part B: Methodological, 45 (10): 1727-1748, 2011.

H. J. Payne. *Models of freeway traffic and control*, volume 1 of *Simulation Councils Proc. Ser.* Bekey, G. A., 1971.

P. I. Richards. *Shock waves on the highway*. Operations research, 4 (1): 42-51, 1956.

A. T. Rouphail, N. M. Li, and C. Li. *Traffic flow theory: A state-of-the-art report*, 2005.

G. B. Whitham. *Linear and nonlinear waves*, volume 42. Wiley-interscience, 2011.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope or the invention. In addition, from the foregoing it will be seen that this invention is one well adapted to attain all the ends and objects set forth above, together with other advantages. It will be understood that certain features and sub-combinations are of utility and may be employed without reference to other features and sub-combinations. This is contemplated and within the scope of the appended claims. All such similar substitutes and modifications apparent to those skilled in the art are deemed to be within the spirit and scope of the invention as defined by the appended claims.

The invention claimed is:

1. A system for estimating traffic signal timing, comprising:
   a computer processor; and
   a non-transitory computer readable medium containing instructions directing the system to execute steps comprising:
   extracting one or more trajectories of a vehicle from probe data;
   matching the one or more trajectories to a map, wherein the map comprises one or more intersections and the one or more trajectories passes through the one or more intersections;
   determining one or more traffic signal cycles of a traffic light at the one or more intersections; and
   computing a signal timing estimation for the traffic light, based on an optimization of a score function,
   wherein the score function is a function of (1) an offset parameter and (2) the one or more traffic signal cycles for the traffic light at the one or more intersections,
   wherein the score function is a product of terms, each term being a sum of exponentials, and
   wherein the offset parameter accounts for an unknown starting time of a cycle of the traffic light at the one or more intersections.

2. The system of claim 1, wherein the probe data comprises information sent a vehicle on a roadway.

3. The system of claim 1, wherein at least some of the one or more trajectories is associated with the vehicle passing through the one or more intersections.

4. The system of claim 3, wherein the optimization of the scoring function is a deterministic model.

5. The system of claim 4, wherein the deterministic model is a gradient descent model.

6. A method of estimating traffic signals, comprising:
   constructing trajectories of probe vehicles from GPS data emitted by the probe vehicles passing through one or more intersections;
   estimating traffic signal cycles of a traffic light at the one or more intersections based on transition times of the probe vehicles starting after the traffic light turns green; and
   combining estimates of the traffic signal cycles; and
   computing a traffic signal timing of the traffic light by maximizing a scoring function,
   wherein the scoring function is a function of (1) an offset parameter and (2) the estimates of the traffic signal cycles of the traffic light at the one or more intersections,
   wherein the scoring function is a product of terms, each term being a sum of exponentials, and
   wherein the offset parameter accounts for an unknown starting time of a cycle of the traffic light at the one or more intersections.

7. The method of claim 6, wherein the scoring function is maximized by a deterministic model.

8. The method of claim 6, wherein the scoring function is maximized according to a gradient descent.

9. An intelligent transportation system for estimating traffic signal timing, comprising:
   a sensor array for detecting probe signals, wherein the probe signals comprise probe position data;
   a network connecting the sensor array with a computer processor;
   a non-transitory computer readable medium containing instructions directing the system to execute steps comprising:
   extracting one or more trajectories from probe data;
   matching the one or more trajectories to a map, wherein the map comprises one or more intersections and the one or more trajectories passes through the one or more intersections;
   determining one or more traffic signal cycles of a traffic light at the one or more intersections; and
   computing a signal timing estimation for the traffic light, based on an optimization of a score function,
   wherein the score function is a function of (1) an offset parameter and (2) the one or more traffic signal cycles for the traffic light at the one or more intersections, wherein the score function is a product of terms, each term being a sum of exponentials, and wherein the offset parameter accounts for an unknown starting time of a cycle of the traffic light at the one or more intersections.

10. A method of estimating traffic signals, comprising:

extracting one or more trajectories from probe data;

matching the one or more trajectories to a map, wherein the map comprises one or more intersections and the one or more trajectories passes through the one or more intersections;

determining one or more traffic signal cycles of a traffic light at the one or more intersections; and computing a signal timing estimation for the traffic light, based on an optimization of a scoring function, wherein the score function is a function of (1) an offset parameter and (2) the one or more traffic signal cycles for the traffic light at the one or more intersections, wherein the score function is a product of terms, each term being a sum of exponentials, and wherein the offset parameter accounts for an unknown starting time of a cycle of the traffic light at the one or more intersections.

11. The method of claim 10, wherein the probe data comprises information sent a vehicle on a roadway.

12. The method of claim 11, wherein at least some of the one or more trajectories is associated with the vehicle passing through the one or more intersections.

13. The method of claim 10, wherein the optimization of the scoring function is a deterministic model.

14. The method of claim 13, wherein the deterministic model is a gradient descent model.

15. The method of claim 11, wherein the probe data are extracted from GPS data emitted from one or more devices disposed in one or more vehicles.

16. The method of claim 15, wherein the one or more devices comprise a smart phone.

17. The method of claim 15, wherein the one or more devices comprise a GPS device.

18. The method of claim 1, wherein the score function is a product of L sub-functions, where L is a number of incoming links along the one or more trajectories of the vehicle, the incoming links being associated with the one or more intersections.

19. The method of claim 6, wherein the score function is a product of L sub-functions, where L is a number of incoming links along the one or more trajectories of the vehicle, the incoming links being associated with the one or more intersections.

20. The method of claim 10, wherein the score function is a product of L sub-functions, where L is a number of incoming links along the one or more trajectories of the vehicle, the incoming links being associated with the one or more intersections.

* * * * *